Patented June 7, 1949

2,472,171

UNITED STATES PATENT OFFICE 2,472,171

METHOD FOR PRODUCING ELECTRODES FOR ELECTRIC ARCS

Marcel Victor Oswald, Paris, France, assignor to Societe Le Carbone Lorraine, Paris, France No Drawing. Application January 30, 1947, Serial No. 725,262. In France February 9, 1946

15 Claims. (Cl. 176—133)

The present invention has for its object the production of improved electrodes for electric arcs.

It is known since a long time to incorporate silicon into carbons used in the electric industry, said silicon being incorporated under the form of silicates or silicon carbide. However these substances show certain drawbacks; in particular the silicates and silicon carbide which are water-insoluble should be dispersed into very fine powders for distributing them perfectly in the carbon or in the cores. This distribution requires therefore crushing and kneading operations the result of which is not always quite regular. On the other hand if soluble silicates may be dispersed in a correct manner, they are but little stable in the presence of air and have a tendency to release silica and to lose their agglomerating power.

According to the invention, these difficulties are avoided through the incorporation of silicon to the carbon under the form of organic products partly oxidised and capable of becoming solid or to harden through polymerisation. The simplest type of such organic substances is the dimethyl-silicone OSi (CH$_3$)$_2$. It is possible to reach the same object with equivalent results by means of meta and ortho-silicates of methyl, ethyl and the like. The silicon containing material may be used either as a component of pastes which are then after hardened or else as impregnating material for previously made electrodes or parts of electrodes or else under the form of very thin coats at the outer surface of the electrodes. The following description will disclose in succession the different forms of application of the invention and the novel results obtained thereby.

According to a first form of execution pastes are prepared the solid components of which are formed by carbonaceous and/or mineral powders such as are generally used in electric industry and the agglomerating components of which whether liquid or pasty, are formed by pure silico-organic products diluted in volatile solvents.

The paste thus obtained may be drawn through extrusion and form homogeneous electrodes assuming the shape of solid cylinders. They may also be drawn under tubular shape and form sheaths inside which is secured the usual mineral core. When such homogeneous electrodes or such tubes of carbon are made, the constitutive powders are admixed with siliceous compounds selected in a manner such that after extrusion in the hydraulic press it may be possible to obtain solid rods or tubes showing a certain resistance to deformation but that it is necessary to harden. The hardening is performed through heating to a temperature underneath about 200° C. if the agglomerating material is a silicone. The latter is polymerized and is transformed into a hard insoluble and infusible material which gives the rod the necessary cohesion.

If alkyl silicates are used, it is advisable to admix them with a little water in the making of the paste and then abandon the tubes or rods thus prepared in an atmosphere saturated with moisture so as to produce the gradual hydrolysis of the silicate and to leave in place colloidal silicates. This method is of particular advantage when it is desired to produce a core according to the invention. In this case, there is prepared a paste which is substantially less compact than in the preceding case and this paste is injected into a previously prepared hardened tube of carbon or graphite. Once the tube is full, the hardening of this siliceous material is produced through heating or hydrolysis according as to whether a silicone or a silicic ester is used. It is obviously possible to associate a core thus prepared with organo-silicic compounds, with a sheath which does not include such substances; conversely it is possible to introduce a core devoid of any organo-silicic compound inside a tube or sheath containing such compounds and which has been executed in accordance with the above description. Lastly the sheath and the core may both contain identical or different organo-silicic compounds or the products obtained through the pyrolysis or hydrolysis thereof.

As a modification, it is possible to heat products containing organo-silicic compounds to a temperature sufficient for decomposition and release of colloidal silica. This technique is generally of advantage in the case of the use of silicones as the undecomposed silicones may evolve unpleasent smokes under the action of the heat of the arc.

According to a further form of execution it is possible to coat or to moisten electrodes of the usual type or electrodes according to the invention with silicones or organo silicic compounds adapted to produce silicones. The electrodes thus treated are no longer sensitive to moisture and their superficial contents of silicon is comparatively low so as not to modify the characteristics of the arc. This treatment of the electrodes is suitable for electrodes adapted for kinematographical projection, in which case the operators wish to use only perfectly dry carbon. For this superficial impregnation, it is generally sufficient to submit the electrodes to the vapors evolved by the halogenides or organic compounds of silicon such as the vapors of dimethyl silicon chloride and then to a moist or ammoniacal atmosphere.

When the silicic compound serves as a binder it may occur that the amount thereof incorporated may be such that the resulting mineralization has too great contents of silicon. In this case, it is possible to associate with the siliceous compound an organic binder which is then carbonized at a suitable temperature, say between 400 and 1400° C.

By way of example, I may mention the production of homogeneous electrodes having as a main component practically pure carbon and containing very small amounts of silicon incorporated through impregnation with a diluted solution of dimethyl-silicone. Thus electrodes having as a main component lampblack for arcs jumping inside a closed vessel are impregnated throughout with a solution in benzene of 3% of its weight of slightly polymerized dimethyl-silicone. After impregnation, the electrode is dried and calcined inside a neutral or reducing atmosphere towards 800° C. The silicone is decomposed and there remains a very small amount of silica perfectly well distributed which stabilises the arc and regularises the combustion of the arc inside a closed vessel. This treatment may be executed on the anode and on the cathode or else on a single electrode if desired.

As another example, I may mention the incorporation of small contents of silicon inside a mass of carbon incorporating rare earths for intense arcs. This incorporation may be performed by means of silicones or a silicic ester, preferably by impregnating a previously hardened core in the form of a rod which is then heated with a view to decomposing the silicone or else submitted to a hydrolysis of its silicic ester after which finally the treated rod is inserted and secured inside a carbon or graphite tube with a very small play. The contents of silicon to be incorporated is preferably lower than 2% of the weight of the core and it is generally near 0.2 to 0.6%.

Another form of execution consists in inserting a hardened rod shaped core inside a carbon or graphite tube and to stick it thereto through the agency of a glue made with a silicone or a silicic ester thickened through a suitable addition of subdivided carbon. The adherence of the core to its sheath is excellent after the silicone has been polymerised or the silicic ester has been hydrolysed. It is not necessary to thermically decompose the silicone of which the amount present in the material is too small to detrimentally affect the arc.

As mentioned hereinabove, my invention allows distributing the silicon in a perfectly uniform manner throughout the carbon and consequently to obtain arcs which are very steady and regular and produce an illumination without any fluctuation which is of particular interest in the illumination of studios. On the other hand, when the electrodes are coated with a silicone film and become thus water repellent, they remain dry and are not liable to show a faulty operation when the carbons have been stored in cold or moist premises.

In the case of electrodes for intense arcs the application of the above mentioned siliceous components allows regularizing the arc without any substantial loss of its illuminating capacity, in contradistinction with the result obtained when associating silicon carbide with rare earths in the cores of such carbons.

What I claim is:

1. A method for producing electrodes for electric arcs, comprising in combination the steps of forming a paste from a solid carbonaceous matter, an organic silicon compound and an organic volatile solvent; shaping the material thus obtained; and then subjecting it to a hardening treatment.

2. A method for producing electrodes for electric arcs, comprising in combination the steps of forming a paste from a pulverulent inorganic matter, an organic silicon compound and an organic volatile solvent; shaping the material thus obtained; and then subjecting it to a hardening treatment.

3. A method for producing electrodes for electric arcs, comprising in combination the steps of forming a paste from a solid carbonaceous matter, a pulverulent inorganic matter, an organic silicon compound and an organic volatile solvent; shaping the material thus obtained; and then subjecting it to a hardening treatment.

4. A method for producing electrodes for electric arcs, comprising in combination the steps of forming a paste including a dimethyl silicone and a volatile organic solvent; shaping the material; and then subjecting it to a hardening treatment by application of heat.

5. A method for producing electrodes for electric arcs, comprising in combination the steps of forming a paste including an alkyl silicate and a volatile organic solvent; shaping the material; and exposing it to a moisture saturated atmosphere so as to form colloidal silicates.

6. A method for producing electrodes for electric arcs, comprising in combination the steps of forming a paste including methyl silicate and a volatile organic solvent; shaping the material; and exposing it to a moisture saturated atmosphere so as to form colloidal silicates.

7. A method for producing electrodes for electric arcs, comprising in combination the steps of forming a paste including ethyl silicate and a volatile organic solvent; shaping the material; and exposing it to a moisture saturated atmosphere so as to form colloidal silicates.

8. A method for producing electrodes for electric arcs, comprising in combination the steps of forming a paste including an organic silicon compound and a volatile organic solvent; injecting the material into a pre-made tube of carbonaceous material; and then subjecting the tube to a hardening treatment.

9. A method for producing electrodes for electric arcs, comprising in combination the steps of forming a paste including an organic silicon compound and a volatile organic solvent; coating a pre-made core with the thus obtained material; and then subjecting the structure to a hardening treatment.

10. A method for producing electrodes for electric arcs, comprising in combination the steps of subjecting a pre-made electrode structure to the vapor of dimethyl silicon chloride; and thereafter exposing the structure to a moist atmosphere.

11. A method for producing electrodes for electric arcs, comprising in combination the steps of subjecting a pre-made electrode structure to the vapor of dimethyl silicon chloride; and thereafter exposing the structure to an ammonia containing atmosphere.

12. A method for producing electrodes for electric arcs, comprising in combination the steps of introducing a hardened core into a tube of carbonaceous material; forming an intermediate layer of an organic silicon compound between said core and said tube; and then adhering the said core and said tube to each other by hardening the said intermediate layer.

13. A method for producing electrodes for electric arcs, comprising in combination the steps of introducing a hardened core into a tube of carbonaceous material; forming an intermediate layer of a silicone compound between said core and said tube; and then adhering the said core and said tube to each other by subjecting the same to a heat treatment so as to harden and polymerize the said intermediate layer.

14. A method for producing electrodes for electric arcs, comprising in combination the steps of introducing a hardened core into a tube of carbonaceous material; forming an intermediate layer of an organic silicon ester between said core and said tube and then adhering the said core and said tube to each other by subjecting the said layer to a gradual hydrolysis.

15. A composite carbon electrode, comprising in combination, an inner core of carbonaceous material; an outer sheath of carbonaceous material; and an intermediate layer for adhering said core and sheath together, the said layer being formed of an organic silicon compound.

MARCEL VICTOR OSWALD.

REFERENCES CITED

The following references are of record in the file of this patent:

UNITED STATES PATENTS

| Number | Name | Date |
| --- | --- | --- |
| 1,030,327 | Potter | June 25, 1912 |
| 1,148,184 | Mott | July 27, 1915 |
| 1,322,491 | King | Nov. 18, 1919 |
| 1,381,748 | Rouse | June 14, 1921 |